US012424374B2

(12) United States Patent
Sano et al.

(10) Patent No.: US 12,424,374 B2
(45) Date of Patent: Sep. 23, 2025

(54) INDUCTOR COMPONENT AND ELECTRONIC COMPONENT

(71) Applicant: Murata Manufacturing Co., Ltd., Kyoto-fu (JP)

(72) Inventors: Rikiya Sano, Nagaokakyo (JP); Masayuki Yoneda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 836 days.

(21) Appl. No.: 17/652,907

(22) Filed: Feb. 28, 2022

(65) Prior Publication Data

US 2022/0293329 A1 Sep. 15, 2022

(30) Foreign Application Priority Data

Mar. 11, 2021 (JP) ................................ 2021-039337

(51) Int. Cl.
*H01F 27/28* (2006.01)
*H01F 27/29* (2006.01)
*H01F 27/32* (2006.01)

(52) U.S. Cl.
CPC ....... *H01F 27/2804* (2013.01); *H01F 27/292* (2013.01); *H01F 27/323* (2013.01); *H01F 2027/2809* (2013.01)

(58) Field of Classification Search
CPC .. H01F 27/2804; H01F 27/292; H01F 27/323; H01F 2027/2809; H01F 2017/004; H01F 17/0013; H01F 27/34; H01F 2017/0073; H01F 2017/048
See application file for complete search history.

(56) References Cited

U.S. PATENT DOCUMENTS

| | | | | |
|---|---|---|---|---|
| 6,169,470 | B1 * | 1/2001 | Ibata | H01F 17/0006 336/200 |
| 2015/0371755 | A1 * | 12/2015 | Im | H01F 27/292 336/200 |
| 2016/0148741 | A1 * | 5/2016 | Kitamura | H01F 27/02 29/605 |
| 2017/0076851 | A1 * | 3/2017 | Araki | H01F 41/0246 |
| 2017/0103848 | A1 * | 4/2017 | Yoneda | H01F 17/0013 |
| 2018/0096778 | A1 * | 4/2018 | Yatabe | H01G 4/30 |
| 2019/0006088 | A1 * | 1/2019 | Tomonari | H01F 27/2847 |
| 2019/0237246 | A1 * | 8/2019 | Wakabayashi | H01F 27/2804 |
| 2019/0362873 | A1 * | 11/2019 | Arai | H01F 27/292 |
| 2020/0098507 | A1 * | 3/2020 | Shiga | H01F 27/2804 |
| 2020/0105462 | A1 * | 4/2020 | Nogi | H01F 27/2823 |
| 2020/0135385 | A1 * | 4/2020 | Shimizu | H01F 27/2828 |
| 2020/0281078 | A1 * | 9/2020 | Takahashi | H01F 17/0013 |
| 2021/0065975 | A1 * | 3/2021 | Ishima | H01F 41/04 |
| 2022/0130600 | A1 * | 4/2022 | Sano | H01F 27/292 |

FOREIGN PATENT DOCUMENTS

| | | |
|---|---|---|
| JP | H09-129458 A | 5/1997 |
| JP | H09-148135 A | 6/1997 |
| JP | 2009-088212 A | 4/2009 |
| JP | 2015-015297 A | 1/2015 |

* cited by examiner

*Primary Examiner* — Mang Tin Bik Lian
(74) *Attorney, Agent, or Firm* — Studebaker Brackett PLLC

(57) ABSTRACT

An inductor component comprising an element body; and a coil disposed within the element body and wound along an axial direction. In an inner diameter of the coil, the inner diameter of the coil at both end portions in the axial direction is greater than the inner diameter of the coil at a central portion in the axial direction.

20 Claims, 11 Drawing Sheets

INDUCTOR COMPONENT AND ELECTRONIC COMPONENT

CROSS REFERENCE TO RELATED APPLICATION

This application claims benefit of priority to Japanese Patent Application 2021-039337, filed Mar. 11, 2021, the entire content of which is incorporated herein by reference.

BACKGROUND

Technical Field

The present disclosure relates to an inductor component and an electronic component.

Background Art

As a conventional inductor component there is one described in JP2015-015297A. This inductor component comprises an element body and a coil disposed within the element body and wound along its axial direction.

SUMMARY

In the inductor component as in the prior art, it was found that there is room to increase the Q value. Specifically, in this inductor component, the inner diameter of the coil is constant in its axial direction. For this reason, the magnetic flux density is lower around the both end portions of the coil in the axial direction than around the central portion of the coil in the axial direction, lowering the inductance. As a result, it was found that current concentrates on both end portions of the coil, increasing power loss to lower the Q value.

Therefore, the present disclosure provides an inductor component capable of increasing the Q value and an electronic component.

An inductor component as an aspect of the present disclosure comprises an element body; and a coil disposed within the element body and wound along an axial direction. In an inner diameter of the coil, the inner diameter of the coil at both end portions in the axial direction is greater than the inner diameter of the coil at a central portion in the axial direction.

As used herein, “the inner diameter of the coil” refers to a diameter of the inside of the coil on a section orthogonal to the axis of the coil. When the coil is wound in an elliptical orbit or a polygonal orbit, “the inner diameter of the coil” varies in each turn. However, in that case, for example, a “maximum value” of “the inner diameter of the coil” in each turn may be used for the comparison between the inner diameter at the both end portions of the coil and the inner diameter at the central portion of the coil.

According to the embodiment, in an inner diameter of the coil, the inner diameter of the coil at both end portions in the axial direction is greater than the inner diameter of the coil at a central portion in the axial direction. For this reason, lowering in magnetic flux density is suppressed around the both end portions of the coil, leading to suppression of lowering in inductance. As a result, current is less likely to concentrate on the both end portions of the coil, so that power loss is suppressed. Thus, the L value acquisition efficiency is improved, enabling the Q value to increase.

In one embodiment of the inductor component, the inner diameter of the coil becomes greater continuously from the central portion of the coil toward the both end portions of the coil.

According to the embodiment, by making the inner peripheral surface of the coil into a shape that follows the flow of magnetic flux, the flow of magnetic flux is less likely to be obstructed, further suppressing the lowering in magnetic flux density around the both end portions of the coil.

Preferably, in one embodiment of the inductor component, the inner diameter of the coil becomes greater stepwise from the central portion of the coil toward the both end portions of the coil.

According to the embodiment, the inner diameter of the coil can be changed stepwise along the axial direction, facilitating the manufacture of the coil and adjustment of the L value.

Preferably, one embodiment of the inductor component further comprises a first external electrode and a second external electrode that are disposed within the element body and electrically connected to the coil. The element body is of a rectangular parallelepiped shape having a length, a width, and a height. The length is greater than the width and height. The element body includes a first end surface and a second end surface that lie on both end sides in the length direction; a first side surface and a second side surface that lie on both end sides in the width direction; and a bottom surface and a top surface that lie on both end sides in the height direction. The coil has an axis parallel to the width direction. The first external electrode is disposed only on the first end surface, the second external electrode is disposed only on the second end surface.

According to the embodiment, the external electrodes are disposed only on the end surfaces of the element body. Since the external electrodes are not disposed on the top surface and bottom surface of the element body in this manner, the flow of magnetic flux is not obstructed by the external electrodes. Due to absence of the external electrodes on the top surface and the bottom surface, the inner diameter of the coil can be increased accordingly on the top surface side and the bottom surface side.

Preferably, in one embodiment of the inductor component, the first end surface and the second end surface each have a recess. The recess opens to the bottom surface. The first external electrode is disposed in the recess of the first end surface, and the second external electrode is disposed in the recess of the second end surface.

According to the embodiment, in the case that the inductor component is mounted on the mounting board, the solder fillets are formed so that the lands of the mounting board are electrically connected to the external electrodes of the inductor component. Since the external electrodes are disposed in the recesses, the solder fillets can be formed inside the element body by the volume of the recesses. In this manner, the solder fillets are formed so as to be accommodated in the recesses for the external electrodes, enabling the dimensions of the inductor component to be increased with respect to the mounting area.

Preferably, in one embodiment of the inductor component, the depth of the recess along the length direction becomes greater toward a center of the recess in the width direction.

According to the embodiment, the depth of the recess along the length direction becomes greater toward the center of the recess in the width direction. For this reason, in the case that the inductor component is mounted on the mounting board, the contact area (fixed area) with solder increases compared with the inductor component having a planar end surface, and the ratio of the fixed area to the surface area of the solder increases. Hence, bond with high fixing strength can be formed with a small amount of solder.

Preferably, in one embodiment of the inductor component, the depth of the recess along the length direction becomes greater stepwise toward the center of the recess in the width direction.

In the case that the inductor component of the embodiment is formed for each layer and laminated for manufacture, the coil and the recess can be formed collectively, whereupon workability can be improved and the number of processes can be decreased to reduce costs.

Preferably, in one embodiment of the inductor component, the coil includes a winding part helically wound overlapping when viewed from the axial direction; a first drawing part that is out of the winding part and connected to the first external electrode; and a second drawing part that is out of the winding part and connected to the second external electrode. The recess has an inner surface that is along a contour of the winding part when viewed from the height direction.

As used herein, “the contour of the winding part” refers to an outside edge of the winding part in a direction orthogonal to the axial direction.

According to the embodiment, the recess can be maximized in volume along the contour of the winding part so that the solder fillet can securely be accommodated.

Preferably, in one embodiment of the inductor component, the recess has an inner surface that is symmetrical with respect to a center of the recess in the width direction when viewed from the height direction.

According to the embodiment, the element body has no directivity due to the symmetry in shape of the element body. Thus, deviation of the inductor component from the position to be mounted can be reduced when mounting the inductor component.

Preferably, in one embodiment of the inductor component, the coil includes a winding part helically wound overlapping when viewed from the axial direction; a first drawing part that is out of the winding part and connected to the first external electrode; and a second drawing part that is out of the winding part and connected to the second external electrode. The minimum distance between the first external electrode and the contour of the winding part is 10 μm or more, and the minimum distance between the second external electrode and the contour of the winding part is 10 μm or more.

According to the embodiment, the minimum distance between the external electrode and the contour of the winding part is 10 μm or more. As a result, since the external electrode and the winding part are arranged apart a predetermined distance or more, it is possible to reduce the short circuit between the external electrode and the winding part caused by mass production variations even if the external electrode is disposed in the recess, leading to improved yield.

An electronic component as an aspect of the present disclosure comprises an inductor component according to any of the embodiments discussed above; and a mounting board having a main surface on which a first land and a second land are arranged. The first external electrode of the inductor component is electrically connected to the first land via solder, and the second external electrode is electrically connected to the second land via solder. In a direction perpendicular to the main surface of the mounting board, the first land, the second land, and the solder is absent between the coil and the main surface.

According to the embodiment, conductive materials like the lands and the solder do not exist between the coil and the main surface of the mounting board. Due to the absence of the conductive materials in a space between the coil and the main surface that corresponds to an external magnetic path in this manner, magnetic flux is hard to shield. Therefore, the L value acquisition efficiency and the Q value of the inductor component can further be enhanced.

Preferably, one embodiment of the electronic component comprises the inductor component; and a mounting board having a main surface on which a first land and a second land are arranged. The first external electrode of the inductor component are electrically connected to the first land via solder, the second external electrode are electrically connected to the second land via solder. When viewed from the axial direction, the first land has a first outer end surface located opposite to the second land, the second land has a second outer end surface located opposite to the first land, and the length of the element body is equal to or greater than the distance between the first outer end surface and the second outer end surface.

According to the embodiment, since the length of the element body is equal to or greater than the distance between the outer end surfaces of the two lands, the dimensions of the inductor component can be increased with respect to the mounting area.

According to the inductor component and the electronic component that are one aspect of the present disclosure, the Q value can be increased.

DETAILED DESCRIPTION

An inductor component and an electronic component as one aspect of the present disclosure will hereinafter be described in detail with reference to embodiments shown. Some of drawings are schematic ones and may not reflect actual dimensions and ratios.

First Embodiment

<Configuration of Inductor Component>

Figure 1:
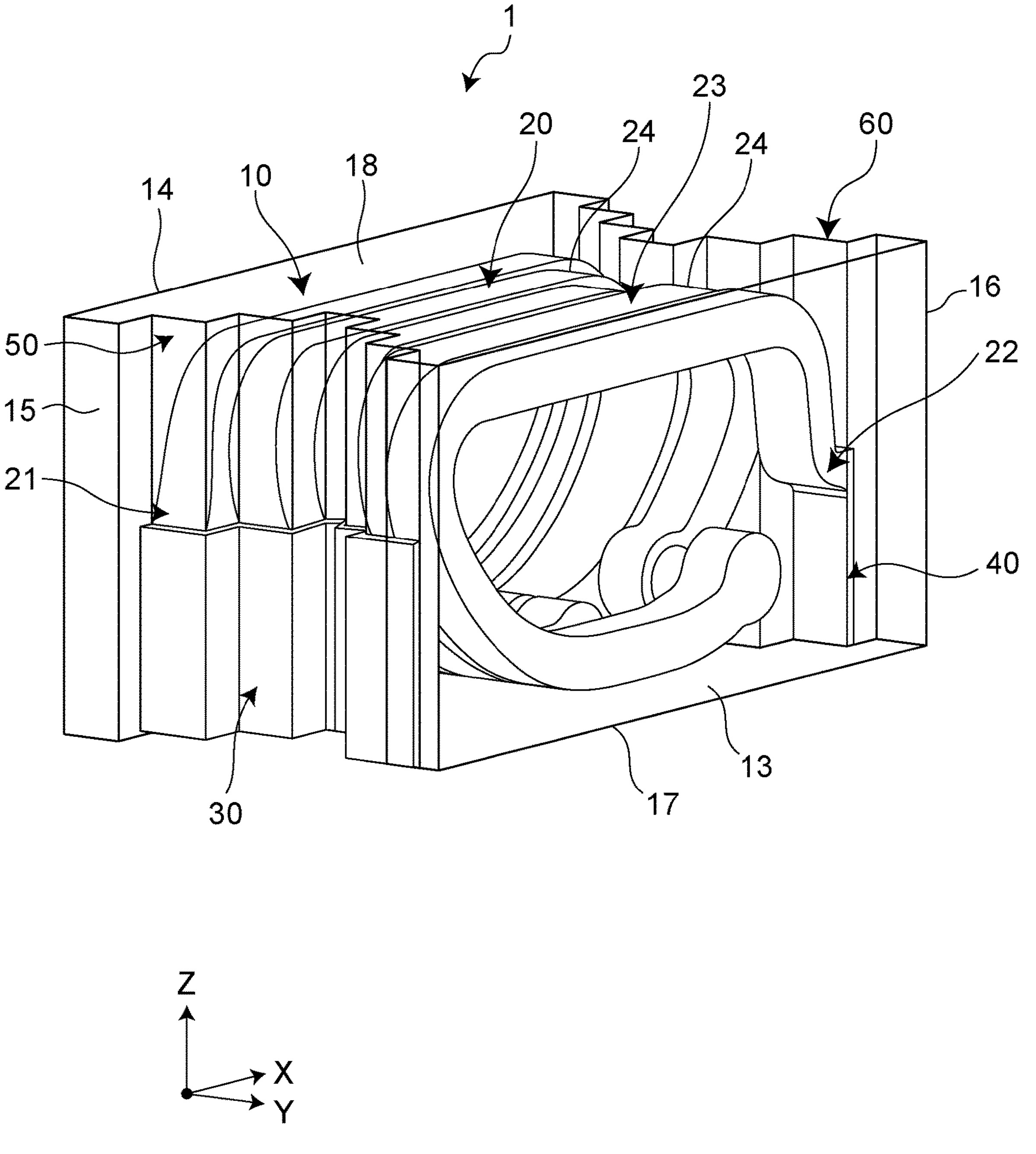
FIG. 1 is a transparent perspective view showing a first embodiment of an inductor component.
Figure 2:
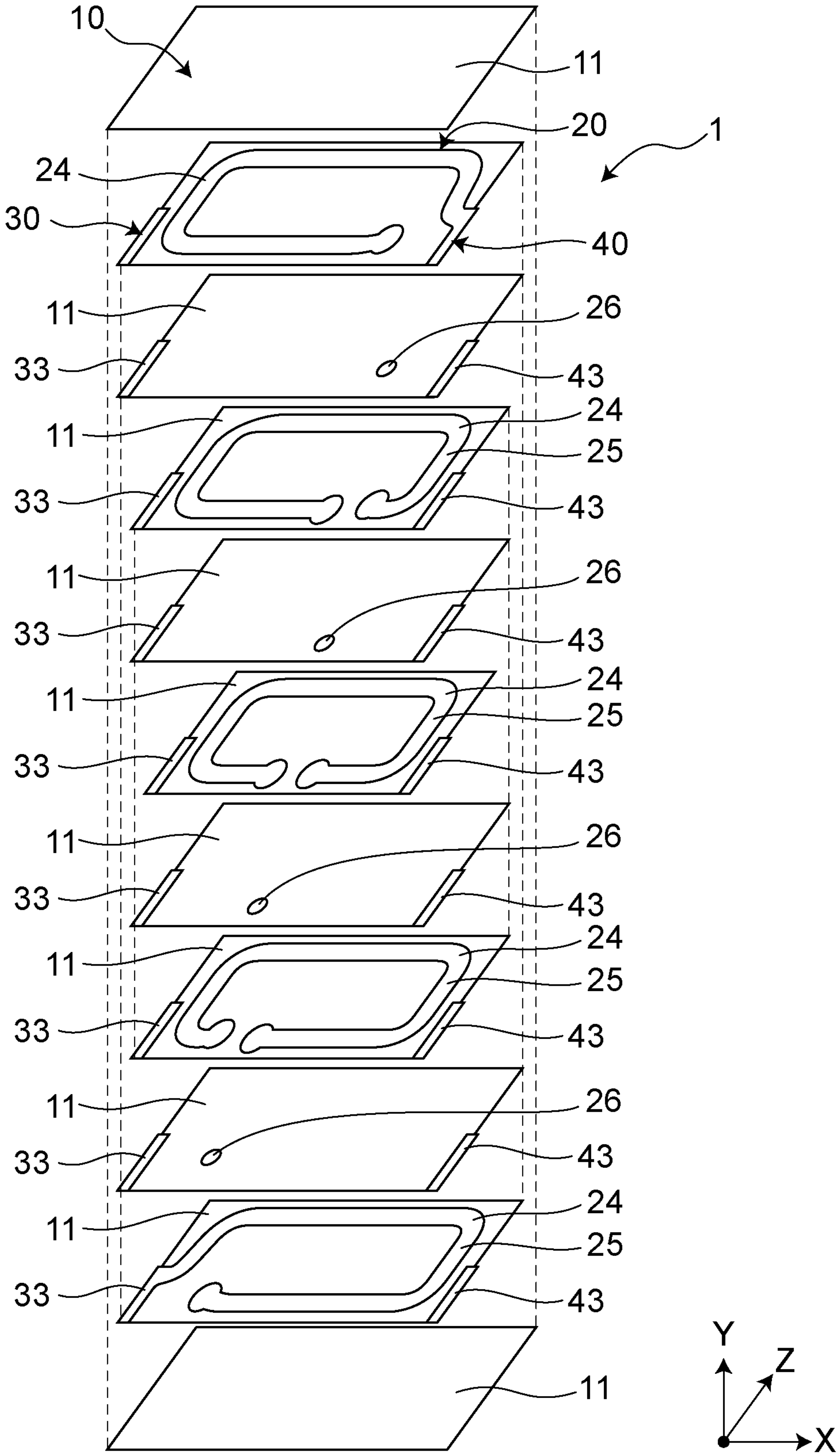
FIG. 2 is an exploded perspective view of the inductor component.

FIG. 1 is a transparent perspective view showing a first embodiment of the inductor component. FIG. 2 is an exploded perspective view of the inductor component. As shown in FIGS. 1 and 2, an inductor component 1 has an element body 10, a coil 20 disposed in the element body 10 and helically wound along an axis, and a first external electrode 30 and a second external electrode 40 disposed on the element body 10 and electrically connected to the coil 20. Although in FIG. 1 the element body 10 is drawn transparently to facilitate the understanding of the structure, it may be translucent or opaque.

The inductor component 1 is electrically connected via the first and second external electrodes 30 and 40 to a wiring on a mounting board not shown. The inductor component 1 is used for example as a coil (matching coil) for impedance matching of a high-frequency circuit and is used in electronic equipment such as personal computers, DVD players, digital cameras, TVs, mobile phones, car electronics, and medical/industrial machinery. Use of the inductor component 1 is not limited thereto and the inductor component 1 can also be used for e.g. tuning circuits, filter circuits, rectifying smoothing circuits, etc.

The element body 10 is of a rectangular parallelepiped shape having a length, a width, and a height, the length being greater than the width and height. As shown, an X direction is a length direction of the element body 10, a Y direction is a width direction of the element body 10, and a Z-direction is a height direction of the element body 10. The X direction, Y direction, and Z-direction are orthogonal to one another. The surface of the element body 10 includes a first end surface 15 and a second end surface 16 lying at both end sides in the length direction, a first side surface 13 and a second side surface 14 lying at both end sides in the width direction, and a bottom surface 17 and a top surface 18 lying at both end sides in the height direction.

The element body 10 is configured by laminating a plurality of insulating layers 11. The insulting layer 11 is made of e.g. a material containing borosilicate glass as the main component or a material such as ferrite or resin. The laminated direction of the insulting layers 11 is the direction (Y direction) parallel to the first and second end surfaces 15 and 16 and the bottom surface 17. That is, the insulating layers 11 are layered extending in the XZ plane. “Parallel” in the present application is not limited to a strict parallel relationship but includes a substantially parallel relationship in consideration of the realistic range of variability. The element body 10 may sometimes have unclear interfaces between the plurality of insulating layers 11 due to firing or the like.

The coil 20 is composed of a conductive material such as e.g. Ag, Cu, or Au or an alloy containing these as the main components. The coil 20 is helically wound along the laminated direction of the insulating layers 11. The coil 20 has a first end connected to the first external electrode 30 and a second end connected to the second external electrode 40. Although in this embodiment the coil and the first and second external electrodes 30 and 40 are integrated together without definite boundaries therebetween, this is not limitative and boundaries may be present by forming the coil and the external electrodes with different materials or different methods.

The coil 20 is wound along its axis such that the axis extends parallel to the width direction of the element body 10. That is, the axis of the coil 20 coincides with the direction (Y direction) of lamination of the insulting layers 11. The axis of the coil means the central axis of the helical shape of the coil 20.

The coil 20 has a winding part 23, a first drawing part 21 connected between a first end of the winding part 23 and the first external electrode 30, and a second drawing part 22 connected between a second end of the winding part 23 and the second external electrode 40. Although in this embodiment the winding part 23 and the first and second drawing parts 21 and 22 are integrated together without definite boundaries therebetween, this is not limitative and boundaries may be present by forming the winding part and the drawing parts with different materials or different methods.

The winding part 23 is helically wound along the axis. That is, the winding part 23 refers to a helically wound portion overlapping when viewed from the axial direction. The first and second drawing parts 21 and 22 refer to portions that are out of the overlapping portion (winding part 23). Although the winding part 23 is formed in a substantially rectangular shape when viewed from the axial direction, it is not limited to this shape. The shape of the winding part 23 may be circular, elliptical, or other polygonal shapes.

The coil 20 has a plurality of coil wirings 24 laminated along the axis and a via wiring 26 extending along the axis to connect the coil wirings 24 adjacent in the axial direction. The plurality of coil wirings 24 are each wound along a plane and constitute a spiral while being electrically connected in series.

The coil wirings 24 are formed wound on main planes (XZ planes) of the insulating layers 11 orthogonal in the axial direction. Although the number of turns of each coil wiring 24 is less than one lap, it may be one or more laps. The via wiring 26 passes through the insulating layers 11 in the thickness direction (Y direction). The coil wirings 24 adjacent in the laminated direction are electrically connected in series via the via wiring 26. In this manner, the plurality of coil wirings 24 constitute a spiral while being electrically connected in series to each other. The coil wiring 24 is composed of a single coil conductor layer 25. The coil wiring 24 may be composed of a plurality of coil conductor layers 25 that are in surface-contact with each other.

The first external electrode 30 and the second external electrode 40 are made of e.g. a conductive material similar to that of the coil 20. The first external electrode 30 is disposed only on the first end surface 15. The first external electrode 30 is embedded in the element body 10 so as to be exposed from the first end surface 15. The second external electrode 40 is disposed only on the second end surface 16. The second external electrode 40 is embedded in the element body 10 so as to be exposed from the second end surface 16.

Since in this manner the external electrodes 30 and 40 are not disposed on the top surface 18 and the bottom surface 17 of the element body, the flow of magnetic flux is not obstructed by the external electrodes 30 and 40. Due to absence of the external electrodes 30 and 40 on the top surface 18 and the bottom surface 17, the inner diameter of the coil 20 can be increased accordingly on the top surface 18 side and the bottom surface 17 side.

It is to be noted that "the external electrodes 30 and 40 are disposed only on the first end surface 15 and only on the second end surface 16, respectively" includes the case where lower ends of the external electrodes 30 and 40 are exposed on the bottom surface 17 and, similarly, includes the case where upper ends of the external electrodes 30 and 40 are exposed on the top surface 18, as shown in FIG. 2. In these cases, however, the external electrodes 30 and 40 do not have portions extended along the bottom surface 17 and the top surface 18 from their respective lower ends and upper ends.

The first external electrode 30 and the second external electrode 40 are configured such that a plurality of first external electrode conductor layers 33 and second external electrode conductor layers 43 embedded in the element body 10 (insulating layers 11) are laminated. The external electrode conductor layers 33 extend along the first end surface 15, while the external electrode conductor layers 43 extend along the second end surface 16. Since this enables the external electrodes 30 and 40 to be embedded in the element body 10, the inductor component can be reduced in size, compared with the configuration in which the external electrodes are externally attached to the element body 10. Further, since the coil 20 and the external electrodes 30 and 40 can be formed in the same process, variations in the positional relationship are reduced between the coil 20 and the external electrodes 30 and 40, achieving a reduction of variations in electrical characteristics of the inductor component 1.

Figure 3A:
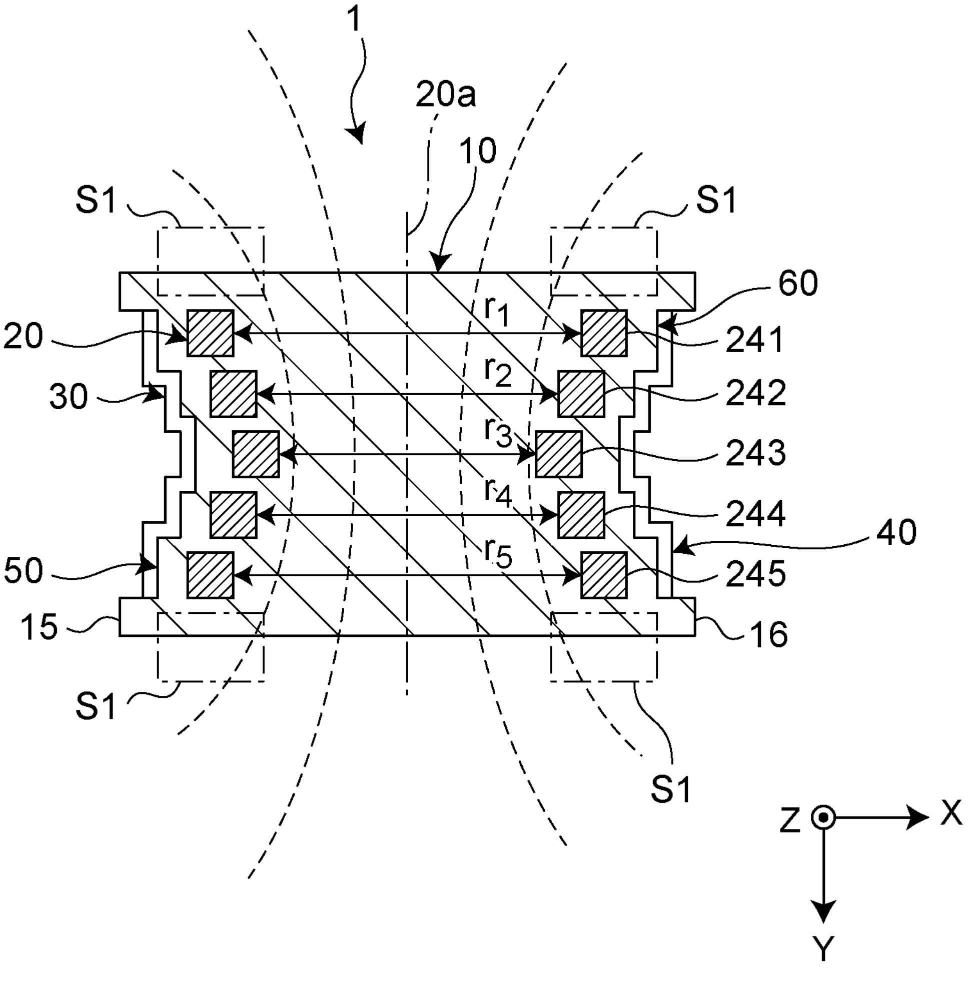
FIG. 3A is a sectional view of the inductor component.

FIG. 3A is a sectional view of the inductor component. FIG. 3A is a sectional view taken along an XY plane that includes an axis 20*a* of the coil 20 and that intersects the first external electrode 30 and the second external electrode 40.

As shown in FIG. 3A, the coil 20 has five layers of coil wirings 241 to 245. Specifically, the first coil wiring 241, the second coil wiring 242, the third coil wiring 243, the fourth coil wiring 244, and the fifth coil wiring 245 are arranged in order along the Y direction. That is, the third coil wiring 243 is located at the central portion of the coil 20 in the axis 20*a* direction. The first coil wiring 241 and the fifth coil wiring 245 are located at both the end portions of the coil 20 in the axis 20*a* direction. The second coil wiring 242 is located between the first coil wiring 241 and the third coil wiring 243. The fourth coil wiring 244 is located between the third coil wiring 243 and the fifth coil wiring 245.

As shown in FIG. 3A, the inner diameter of the coil 20 is greater at the both end portions of the coil 20 in the axis 20*a* direction than at the central portion of the coil 20 in the axis 20*a* direction. The inner diameter of the coil 20 refers to a diameter of the inside of the coil 20 on a section orthogonal to the axis 20*a* of the coil 20, and more specifically, is the inner diameter of the winding part 23 of the coil. In this embodiment, the coil 20 is formed in a substantially rectangular shape and, in FIG. 3A, the coil 20 is cut at a maximum portion of the inner diameter of the coil 20 so as to compare the inner diameter at the both end portions of the coil 20 and the inner diameter at the central portion of the coil 20 by the maximum value of the inner diameter of the coil 20. Although the comparison is made by "maximum value" of the inner diameter of the coil 20, it may be made by "minimum value" or "average value" so that the both end portions of the coil 20 are greater than the central portion of the coil 20.

Specifically, an inner diameter r1 of the first coil wiring 241 and an inner diameter r5 of the fifth coil wiring 245 are each greater than an inner diameter r3 of the third coil wiring 243. The inner diameter r1 of the first coil wiring 241 is equal to the inner diameter r5 of the fifth coil wiring 245. The inner diameter r1 of the first coil wiring 241 may be different from the inner diameter r5 of the fifth coil wiring 245.

An inner diameter r2 of the second coil wiring 242 and an inner diameter r4 of the fourth coil wiring 244 are each greater than the inner diameter r3 of the third coil wiring 243 and less than the inner diameter r1 of the first coil wiring 241 and the inner diameter r5 of the fifth coil wiring 245. The inner diameter r2 of the second coil wiring 242 is equal to the inner diameter r4 of the fourth coil wiring 244. The inner diameter r2 of the second coil wiring 242 may be different from the inner diameter r4 of the fourth coil wiring 244.

According to this embodiment, the inner diameter of the coil 20 is greater at the both end portions of the coil 20 in the axis 20*a* direction than at the central portion of the coil 20 in the axis 20*a* direction. This allows the coil 20 to be arranged so as to extend along magnetic flux that diffuses outward from the vicinity of the inner diameter at the both end portions of the coil 20 in the axis 20*a* direction, with the result that lowering in magnetic flux density is suppressed around the both end portions of the coil 20 (particularly, in regions S1 outside the coil 20 in the axial direction), leading to suppression of lowering in inductance. In FIG. 3A, magnetic flux lines are indicated by broken lines. As a result, current is less likely to concentrate on the both end portions of the coil 20, so that power loss is suppressed. Thus, the inductor component 1 improves its L value acquisition efficiency, enabling the Q value to increase.

Since in FIG. 3A the number of the coil wirings 241 to 245 is odd (5), the coil wiring located at the central portion of the coil 20 in the axis 20*a* direction is only the third coil wiring 243. This makes it possible to determine the magnitude relationship between the inner diameter r3 of the central third coil wiring 243 and the inner diameters r1 and r5 of the first and fifth coil wirings 241 and 245 at the both ends.

On the other hand, in the case that the number of the coil wirings is even, the coil wirings located at the central portion of the coil in the axial direction are two coil wirings. For this reason, the coil diameter of the coil wirings located at the both end portions of the coil in the axial direction should be greater than the inner diameter of at least one coil wiring of two coil wirings located at the central portion of the coil in the axial direction.

As shown in FIG. 3A, the inner diameter of the coil 20 becomes greater continuously from the central portion of the coil 20 toward the both end portions of the coil 20. That is, the inner diameters of the plurality of coil wirings 241 to 245 making up the coil 20 become greater continuously from the coil wiring 243 located at the central portion toward the coil wirings 241 and 245 located at both end portions. Specifically, the inner diameter r3 of the third coil wiring 243 at the center, the inner diameter r2 of the second coil wiring 242, and the inner diameter r1 of the first coil wiring 241 at the end become greater in the mentioned order, while the inner diameter r3 of the third coil wiring 243 at the center, the inner diameter r4 of the fourth coil wiring 244, and the inner diameter r5 of the fifth coil wiring 245 at the end become greater in the mentioned order.

According to the above configuration, by making the inner peripheral surface of the coil 20 into a shape that follows the flow of magnetic flux, the flow of magnetic flux is less likely to be obstructed, further suppressing the lowering in magnetic flux density around the both end portions of the coil 20.

Figure 3B:
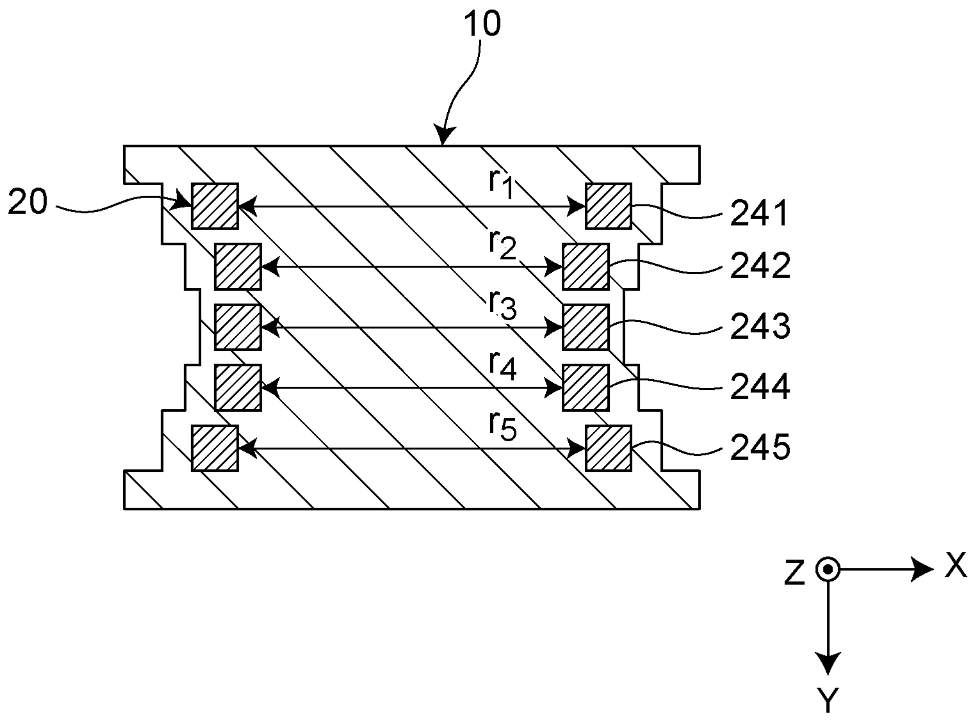
FIG. 3B is a sectional view showing another mode of the inductor component.
Figure 3C:
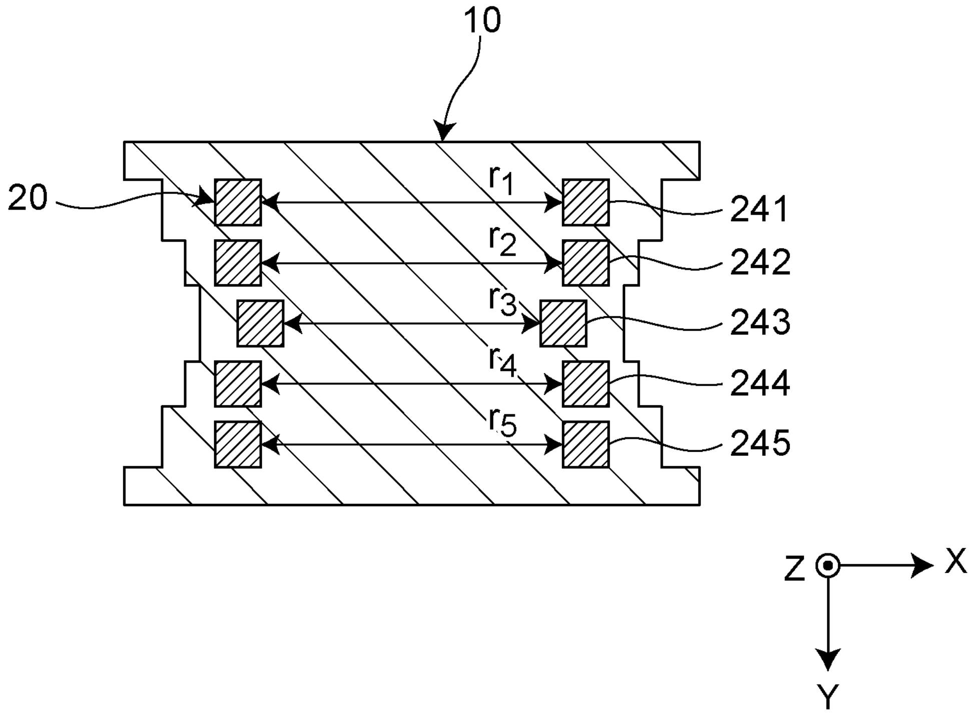
FIG. 3C is a sectional view showing another mode of the inductor component.

The inner diameter of the coil 20 may become greater stepwise from the central portion of the coil 20 toward the both end portions of the coil 20. That is, the inner diameters of the plurality of coil wirings 241 to 245 making up the coil 20 may become greater stepwise from the coil wiring 243 located at the central portion toward the coil wirings 241 and 245 located at the both end portions. For example, as shown in FIG. 3B, the inner diameter r3 of the third coil wiring 243 at the center and the inner diameter r2 of the second coil wiring 242 may be the same, with the inner diameter r1 of the first coil wiring 241 at the end being greater than the inner diameter r2 of the second coil wiring 242 and the inner diameter r3 of the third coil wiring 243. Alternatively, as shown in FIG. 3C, the inner diameter r1 of the first coil wiring 241 at the end and the inner diameter r2 of the second coil wiring 242 may be the same, with the inner diameter r1 of the first coil wiring 241 and the inner diameter r2 of the second coil wiring 242 being greater than the inner diameter r3 of the third coil wiring 243 at the center.

According to the above configuration, the inner diameter of the coil 20 can be changed stepwise along the axis 20*a* direction, facilitating manufacture of the coil 20 and adjustment of the L value.

As shown in FIGS. 1 and 3A, the first end surface 15 of the element body 10 has a first recess 50, while the second end surface 16 of the element body 10 has a second recess 60. The first recess 50 and the second recess 60 each open to the bottom surface 17 and the top surface 18. The first recess 50 and the second recess 60 may open only to the bottom surface 17 without opening to the top surface 18. The first external electrode 30 is disposed in the first recess 50 of the first end surface 15. The second external electrode 40 is disposed in the second recess 60 of the second end surface 16.

Figure 6:
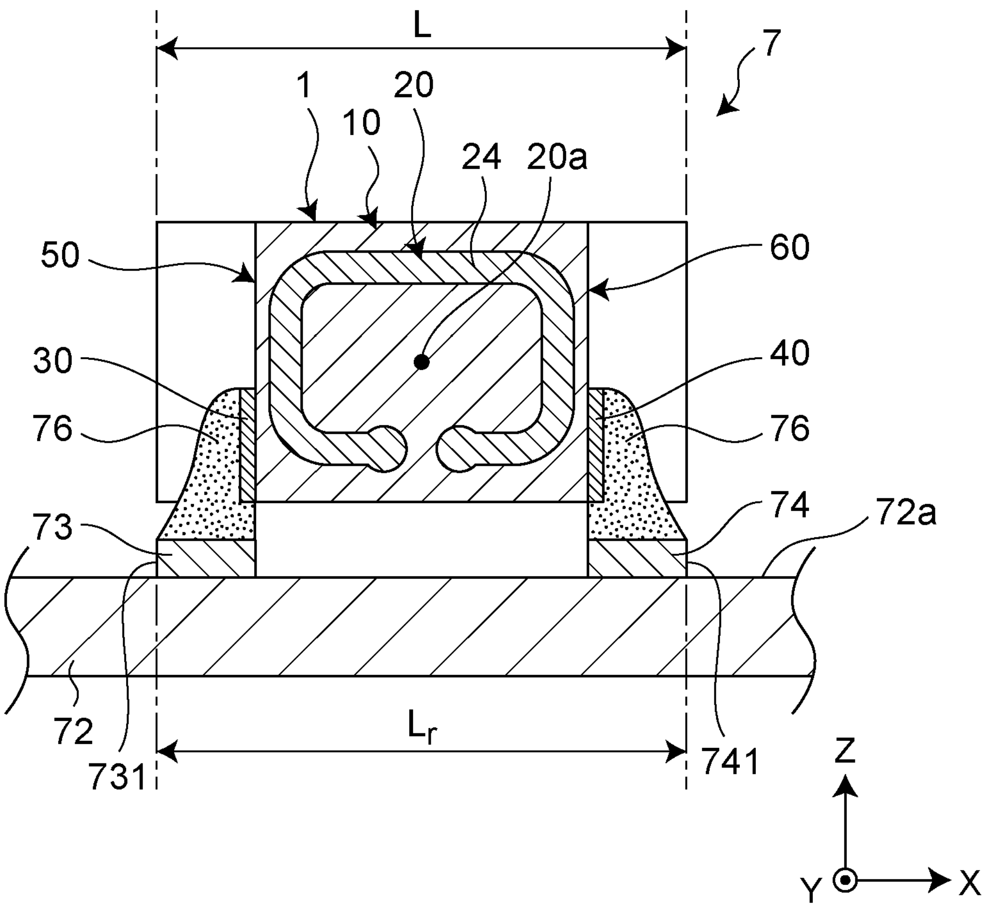
FIG. 6 is a sectional view showing an electronic component mounted with the inductor component.

According to the above configuration, as shown in FIG. 6, in the case that the inductor component 1 is mounted on a mounting board 72 having a main surface 72*a* on which a first land 73 and a second land 74 are arranged, solder 76 forms a solder fillet, with the first land 73 of the mounting board 72 being electrically connected to the first external electrode 30 of the inductor component 1, the second land 74 of the mounting board 72 being electrically connected to the second external electrode 40 of the inductor component 1. Since at this time the external electrodes 30 and 40 are disposed in the recesses 50 and 60, the solder fillet can be formed inside the element body 10 by the volume of the recesses 50 and 60. Since in this manner the solder fillet is formed so as to be accommodated in the recesses 50 and 60 of the external electrodes 30 and 40, the dimensions of the inductor component 1 can be increased with respect to the mounting area. As used herein, the mounting area means an area of a minimum quadrangle encompassing the first land 73 and the second land 74 on the main surface 72*a* of the mounting board 72.

According to the above configuration, the dimensions of the inductor component 1 can be increased with respect to the mounting area, making it possible to enlarge the inner diameter of the coil 20 to increase the L value, or to arrange the coil 20 spaced apart from the external electrodes 30 and 40 to reduce the stray capacitance. Thus, design for achieving improvement in the Q value becomes possible.

Figure 4:
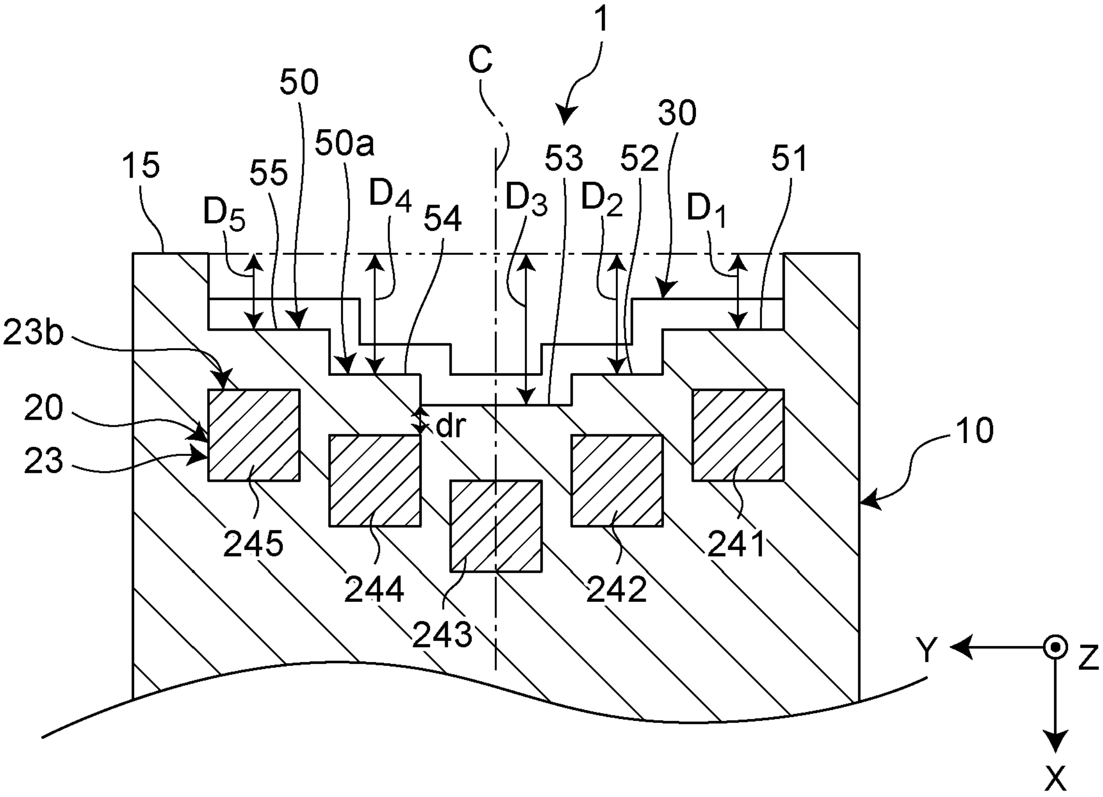
FIG. 4 is an enlarged view of FIG. 3A.

FIG. 4 is an enlarged view of the first external electrode 30 and first recess 50 side of FIG. 3A. Although the configuration of the first recess 50 will hereinafter be described with reference to FIG. 4, the same configuration applies to that of the second recess 60 and hence description thereof will be omitted.

As shown in FIG. 4, preferably, depths D1 to D5 of the first recess 50 along the X direction become greater toward a center (center line C) of the first recess 50 in the Y direction. Specifically, the first recess 50 includes a first portion 51, a second portion 52, a third portion 53, a fourth portion 54, and a fifth portion 55, arranged in the mentioned order along the Y direction. The third portion 53 is located at a central portion of the first recess 50 in the Y direction. The first portion 51 and the fifth portion 55 are located at both end portions of the first recess 50 in the Y direction.

The first portion 51 faces the first coil wiring 241 in the X direction. The second portion 52 faces the second coil wiring 242 in the X direction. The third portion 53 faces the third coil wiring 243 in the X direction. The fourth portion 54 faces the fourth coil wiring 244 in the X direction. The fifth portion 55 faces the fifth coil wiring 245 in the X direction.

A depth D1 of the first portion 51 and a depth D5 of the fifth portion 55 are each less than a depth D3 of the third portion 53. The depth D1 of the first portion 51 and the depth D5 of the fifth portion 55 are the same. The depth D1 of the first portion 51 and the depth D5 of the fifth portion 55 may differ.

A depth D2 of the second portion 52 and a depth D4 of the fourth portion 54 are each less than the depth D3 of the third portion 53 and greater than the depth D1 of the first portion 51 and the depth D5 of the fifth portion 55. The depth D2 of the second portion 52 and the depth D4 of the fourth portion 54 are the same. The depth D2 of the second portion 52 and the depth D4 of the fourth portion 54 may differ.

According to this embodiment, the depths D1 to D5 of the first recess 50 along the X direction become greater toward the center of the first recess 50 in the Y direction. For this reason, in the case that the inductor component 1 is mounted on the mounting board, the contact area (fixed area) with solder increases compared with the inductor component having a planar end surface, and the ratio of the fixed area to the surface area of the solder increases. Hence, bond with high fixing strength can be formed with a small amount of solder.

As shown in FIG. 4, preferably, the depths D1 to D5 of the first recess 50 along the X direction become greater stepwise toward the center of the first recess 50 in the Y direction. Specifically, the first portion 51 to the fifth portion 55 have certain depths D1 to D5, respectively, along the Y direction. That is, an inner surface 50*a* of the first recess 50 is formed in a stepwise manner.

According to the above configuration, in the case that the inductor component 1 is formed for each layer and laminated for manufacturing, the coil 20 and the first recess 50 can be formed collectively, whereupon workability can be improved and the number of processes can be decreased to reduce costs.

As shown in FIG. 4, preferably, the inner surface 50*a* of the first recess 50 is along a contour 23*b* of the winding part 23 of the coil 20 when seen from the Z direction. The contour 23*b* of the winding part 23 is an outside edge of the coil 20 in the direction (X direction in FIG. 4) orthogonal to the axial direction. The inner surface 50*a* being along the contour 23*b* includes not only that the inner surface 50*a* coincides completely with the contour 23*b* but also that the inner surface 50*a* coincides substantially with the contour 23*b*.

According to the above configuration, the first recess 50 can be maximized in volume along the contour 23*b* of the winding part 23 so that the solder fillet can securely be accommodated.

As shown in FIG. 4, preferably, the inner surface 50*a* of the first recess 50 is symmetrical with respect to the center (center line C) of the first recess 50 in the Y direction when viewed from the Z direction. That is, the first portion 51 and the fifth portion 55 are the same in shape; the second portion 52 and the fourth portion 54 are the same in shape; and the shape of the third portion 53 is symmetrical with respect to the center line C.

According to the above configuration, the element body 10 has no directivity due to the symmetry in shape of the element body 10. Thus, deviation of the inductor component 1 from the position to be mounted can be reduced when mounting the inductor component 1.

As shown in FIG. 4, preferably, a minimum distance dr between the first external electrode 30 and the contour 23*b* of the winding part 23*b* is 10 μm or more. According to the above configuration, since the first external electrode 30 and the winding part 23 are arranged apart a predetermined distance or more, it is possible to reduce the short circuit between the first external electrode 30 and the winding part 23 caused by mass production variations even if the first external electrode 30 is disposed in the first recess 50, leading to improved yield. Although not shown, similarly, it is preferred that the minimum distance between the second external electrode 40 and the winding part 23 be 10 μm or more.

<Method of Manufacturing Inductor Component>

Referring then to FIGS. 5A to 5L, a method of manufacturing the inductor component 1 will be described. Hereinafter, in particular, a manufacturing method of the recesses 50 and 60 of the element body 10 and of the external electrodes 30 and 40 will be described with omission of the manufacturing method of the coil 20 (coil wirings 24).

Figure 5A:
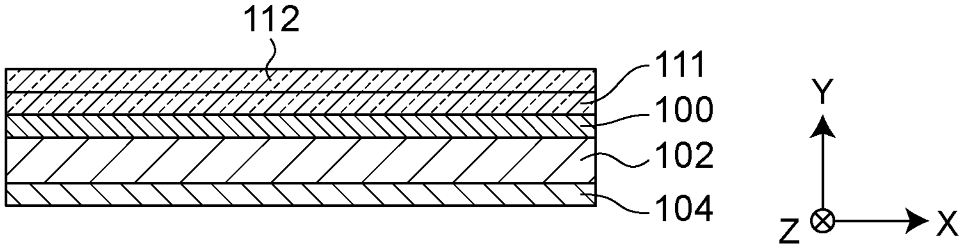
FIG. 5A is an explanatory view explaining a method of manufacturing the inductor component.

As shown in FIG. 5A, a temporary filling layer 102, a mark layer 100, and a first unfired insulating layer 111 and a second unfired insulating layer 112 are laminated on an alumina substrate 104. The temporary filling layer 102 is made of a material that disappears when fired, whose main component is for example an organic resin. The unfired insulating layers 111 and 112 are in the state of the insulating layers 11 before firing and are made of e.g. a material containing borosilicate glass as the main component. The mark layer 100 contains a pigment material in addition to the same material as that of the unfired insulating layer 111. The mark layer 100 is not an essential configuration and may be omitted. In the inductor component 1 described in FIGS. 1 to 4, the mark layer 100 is omitted.

Figure 5B:
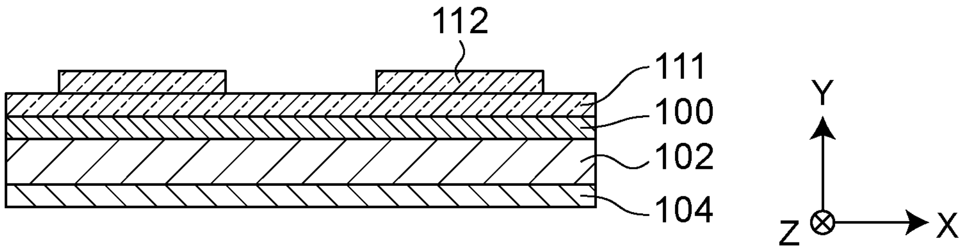
FIG. 5B is an explanatory view explaining the method of manufacturing the inductor component.

As shown in FIG. 5B, the second unfired insulating layer 112 is exposed to light and developed to form a groove pattern in the second unfired insulating layer 112. At this time, the dimension of the second unfired insulating layer 112 in the X direction is formed so as to be less than the dimension of the first unfired insulating layer 111 in the X direction.

Figure 5C:
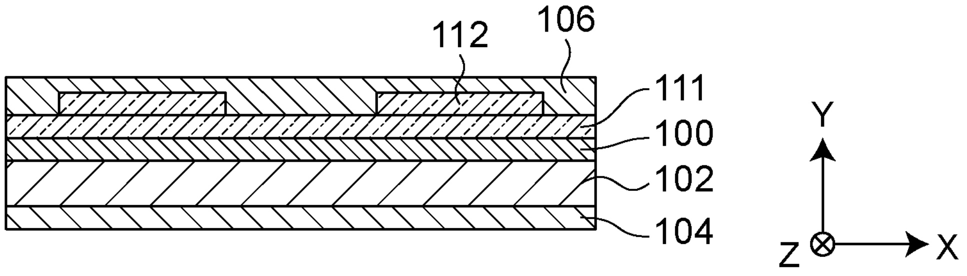
FIG. 5C is an explanatory view explaining the method of manufacturing the inductor component.

As shown in FIG. 5C, a metal film 106 is printed so as to fill the groove. The metal film 106 is in the state of the external electrodes 30 and 40 before firing and is made of a conductive material containing Ag as the main component. Although not described in detail, the coil 20 is formed by the metal film 106 simultaneously with the formation of the external electrodes 30 and 40.

Figure 5D:
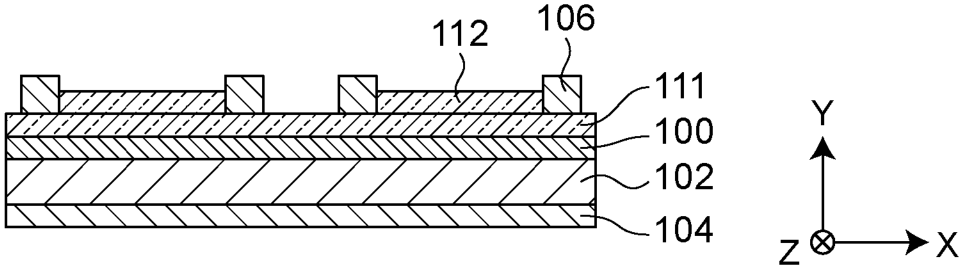
FIG. 5D is an explanatory view explaining the method of manufacturing the inductor component.
Figure 5E:
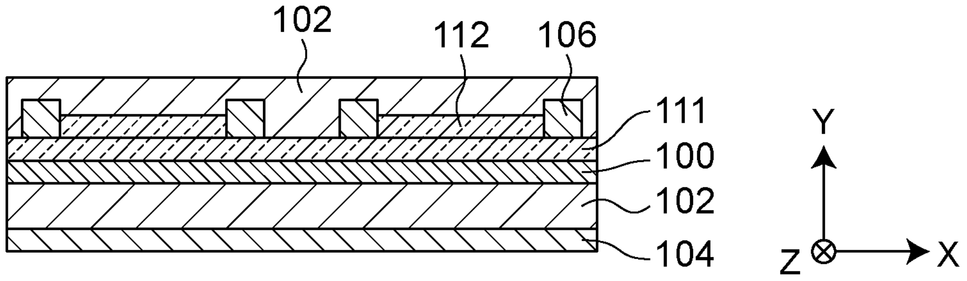
FIG. 5E is an explanatory view explaining the method of manufacturing the inductor component.
Figure 5F:
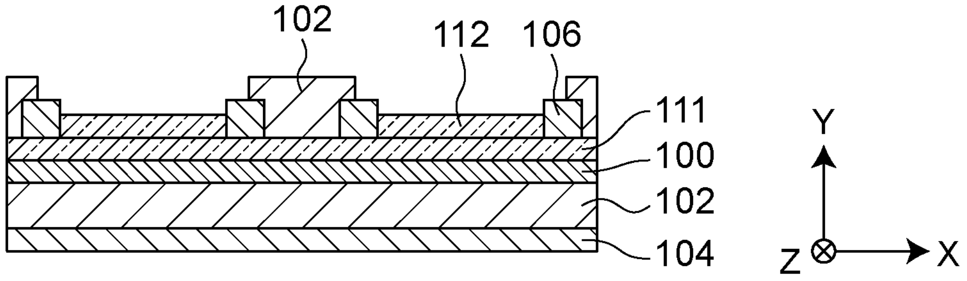
FIG. 5F is an explanatory view explaining the method of manufacturing the inductor component.

The metal film 106 is exposed to light and developed and is formed into a desired shape as shown in FIG. 5D. The temporary filling layer 102 is printed as shown in FIG. 5E, and the temporary filling layer 102 is exposed to light and developed and formed into a desired shape so that the second unfired insulating layer 112 and the metal film 106 are exposed as shown in FIG. 5F.

Figure 5G:
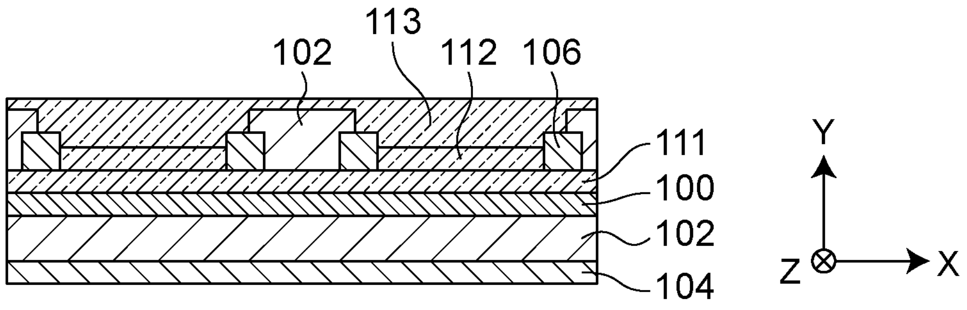
FIG. 5G is an explanatory view explaining the method of manufacturing the inductor component.
Figure 5H:
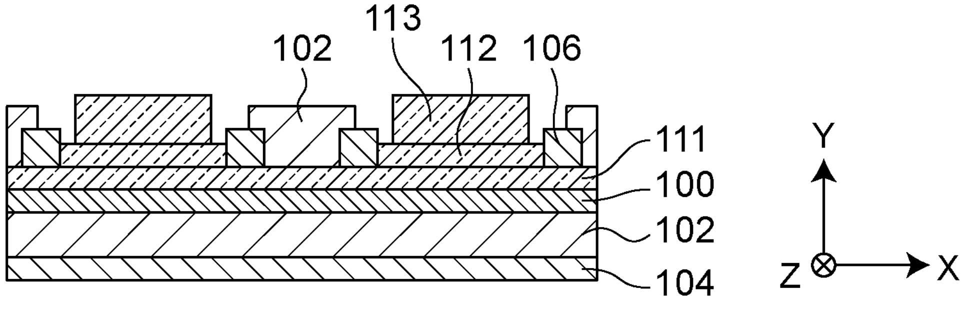
FIG. 5H is an explanatory view explaining the method of manufacturing the inductor component.

A third unfired insulating layer 113 is printed as shown in FIG. 5G, and the third unfired insulating layer 113 is exposed to light and developed and is formed into a desired shape so that the metal film 106 is exposed as shown in FIG. 5H. At this time, the dimension of the third unfired insulating layer 113 in the X direction is formed so as to be less than the dimension of the second unfired insulating layer 112 in the X direction.

Figure 5I:
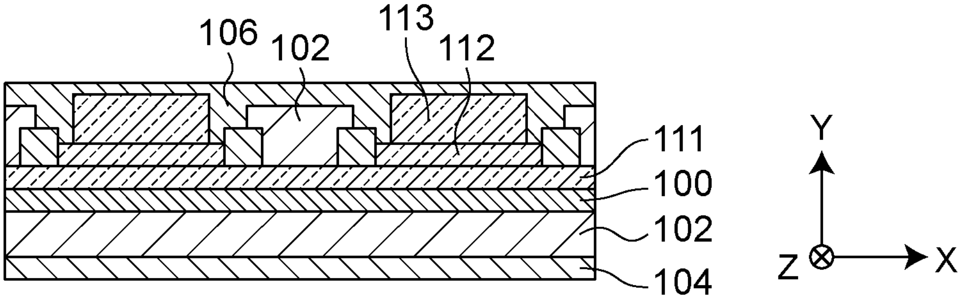
FIG. 5I is an explanatory view explaining the method of manufacturing the inductor component.
Figure 5J:
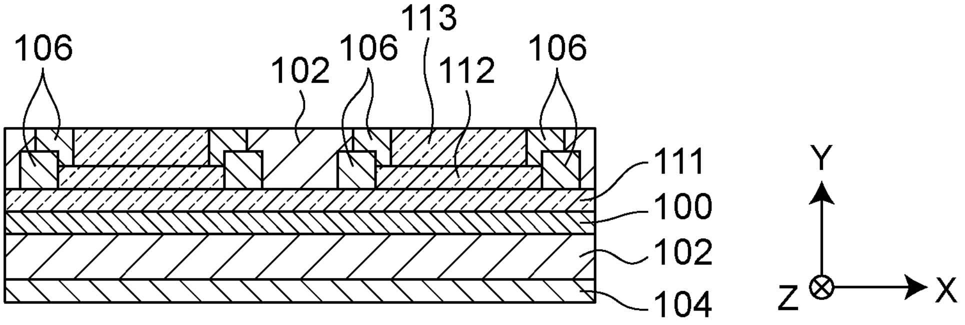
FIG. 5J is an explanatory view explaining the method of manufacturing the inductor component.

The metal layer 106 is further printed so as to fill the groove as shown in FIG. 5I. The metal film 106 is exposed to light and developed so that the third unfired insulating layer 113 and the temporary filling layer 102 are exposed as shown in FIG. 5J.

Figure 5K:
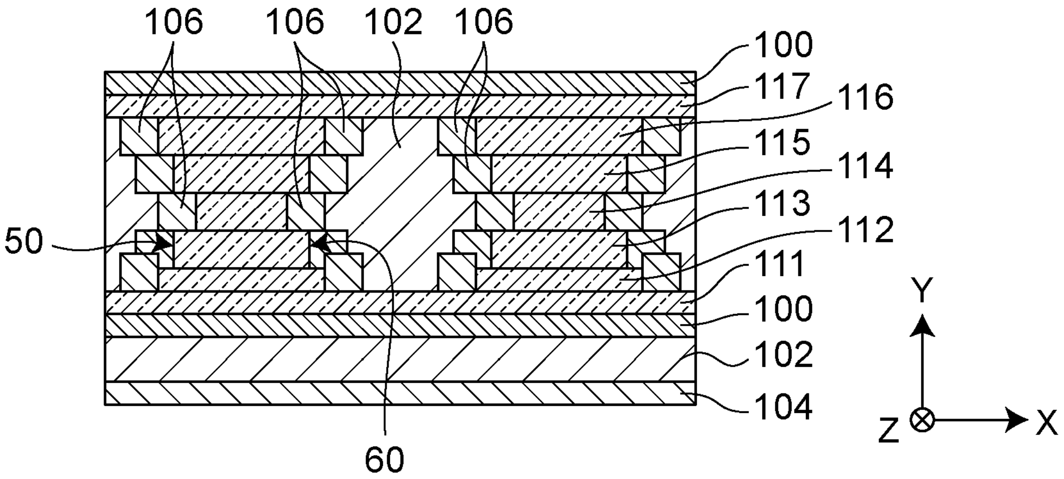
FIG. 5K is an explanatory view explaining the method of manufacturing the inductor component.

By repeating these processes, a fourth unfired insulating layer 114, a fifth unfired insulating layer 115, a sixth unfired insulating layer 116, and a seventh unfired insulating layer 117 are formed so that a mother laminate is formed as shown in FIG. 5K.

At this time, the dimension of the fourth unfired insulating layer 114 in the X direction is formed to be less than the dimension of the third unfired insulating layer 113 in the X direction; the dimension of the fifth unfired insulating layer 115 in the X direction is formed to be greater than the dimension of the fourth unfired insulating layer 114 in the X direction; the dimension of the sixth unfired insulating layer 116 is formed to be greater than the dimension of the fifth unfired insulating layer 115 in the X direction; and the dimension of the seventh unfired insulating layer 117 in the X direction is formed to be greater than the dimension of the sixth unfired insulating layer 116 in the X direction. In this manner, the recesses 50 and 60 are formed by the deviation widths from the first unfired insulating layer 111 to the seventh unfired insulating layer 117. Then, the metal film 106 is formed in these recesses 50 and 60.

Figure 5L:
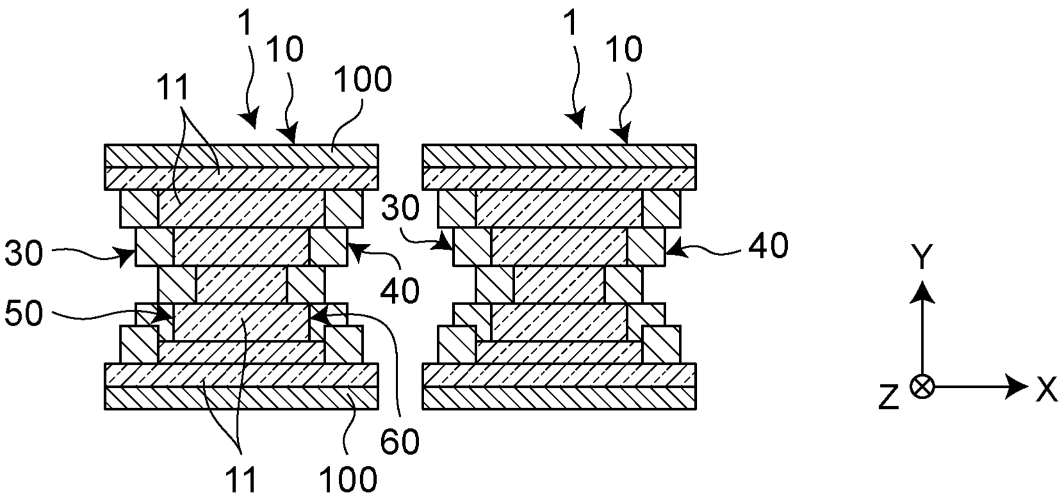
FIG. 5L is an explanatory view explaining the method of manufacturing the inductor component.

Afterward, the mother laminate is cut into a plurality of unfired laminates by dicing or the like, and the plurality of unfired laminations are fired to obtain a plurality of inductor components 1 each including the element body 10 and the external electrodes 30 and 40 as shown in FIG. 5L. The temporary filling layer 102 is burned off by firing, and the external electrodes 30 and 40 are disposed in the recesses 50 and 60.

<Configuration of Electronic Component>

FIG. 6 is a sectional view of an electronic component. As shown in FIG. 6, an electronic component 7 has the above inductor component 1 and the mounting board 72. The mounting board 72 has the first land 73 and the second land 74 arranged on its main surface 72*a*.

The first external electrode 30 of the inductor component 1 is electrically connected to the first land 73 via the solder 76. The second external electrode 40 of the inductor component 1 is electrically connected to the second land 74 via the solder 76.

In the direction perpendicular to the main surface 72*a* of the mounting board 72, the first land 73, the second land 74, and the solder 76 are absent between the coil 20 (coil wirings 24) and the main surface 72*a*. Specifically, the main surface 72 is parallel to the XY plane, and the first land 73, the second land 74, and the solder 76 do not exist between the coil 20 and the main surface 72*a* in the Z direction.

According to the above configuration, conductive materials like the lands 73 and 74 and the solder 76 do not exist between the coil 20 and the main surface 72*a*. Due to the absence of the conductive materials in a space between the coil 20 and the main surface 72*a* corresponding to an external magnetic path in this manner, magnetic flux is hard to shield. Therefore, the L value acquisition efficiency and the Q value of the inductor component 1 can further be enhanced.

As shown in FIG. 6, when viewed from the axis 20*a* direction of the coil 20, the first land 73 has a first outer end surface 731 located opposite to the second land 74, while the second land 74 has a second outer end surface 741 located opposite to the first land 3, with a length L of the element body 10 being equal to or greater than a distance Lr between the first outer end surface 731 and the second outer end surface 741.

According to the above configuration, since the length L of the element body 10 is equal to or greater than the distance Lr between the outer end surfaces 731 and 741 of the two lands 73 and 74, the dimensions of the inductor component 1 can be increased with respect to the mounting area.

Although the electronic component 7 of this embodiment has a first configuration that the first land 73, the second land 74, and the solder 76 do not exist between the coil 20 and the main surface 72*a* and a second configuration that the length L of the element body 10 is equal to or greater than the distance Lr between the outer end surfaces 731 and 741 of the two lands 73 and 74, it may have at least one configuration of the first configuration and the second configuration.

Second Embodiment

FIGS. 7A to 7D are plan views, seen from the top surface, showing another mode of the recess of the element body. The second embodiment differs from the first embodiment in the shape of the recess of the element body. This different configuration will be described below. Other configurations are the same as those of first embodiment and are designated by the same reference numerals to omit description thereof.

Figure 7A:
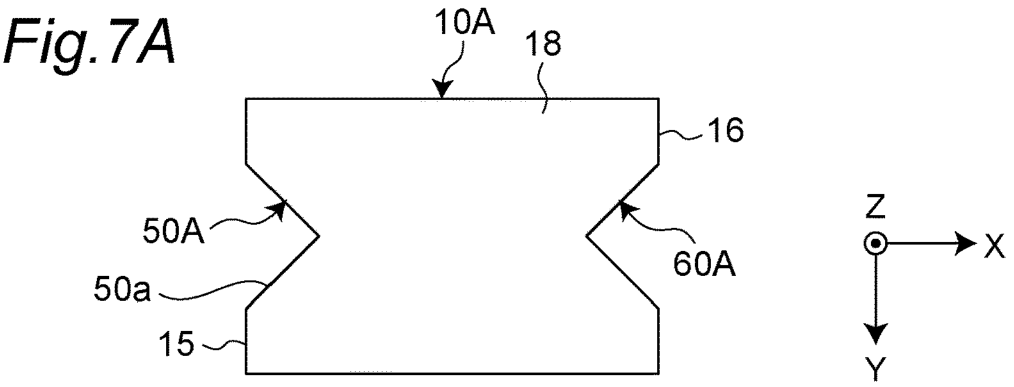
FIG. 7A is a plan view, seen from a top surface, showing another mode of a recess of an element body.

As shown in FIG. 7A, in a first recess 50A of an element body 10A, the depth of the first recess 50A along the X direction becomes greater continuously toward the center of the first recess 50A in the Y direction. Specifically, an inner surface 50*a* of the first recess 50A is formed into a V shape when viewed from the Z direction.

According to the above configuration, when forming the first recess 50A, the flat first end surface 15 is cut into a V shape by dicing or the like after forming the rectangular parallelepiped element body 10A, whereby the first recess 50A can easily be formed. The same configuration applies to the configuration of a second recess 60A.

Figure 7B:
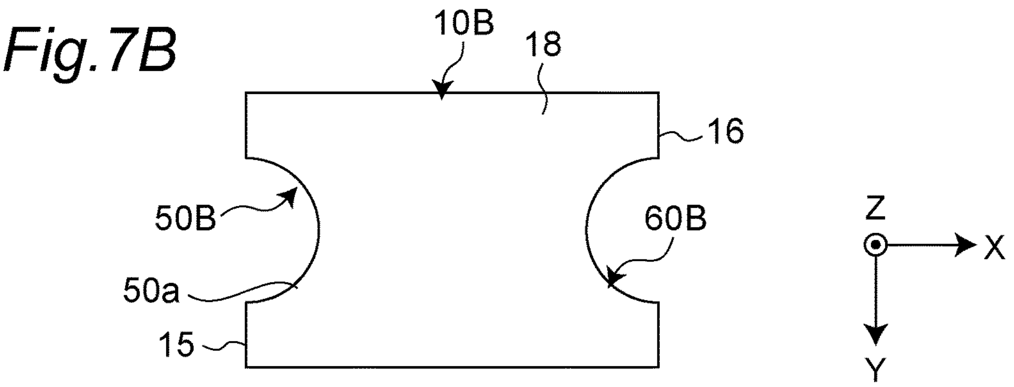
FIG. 7B is a plan view, seen from the top surface, showing another mode of the recess of the element body.

As shown in FIG. 7B, in a first recess 50B of an element body 10B, the depth of the first recess 50B along the X direction becomes greater continuously toward the center of the first recess 50B in the Y direction. Specifically, the inner surface 50*a* of the first recess 50B is formed into a semicircular shape when viewed from the Z direction.

According to the above configuration, when forming the first recess 50B, the first recess 50B can easily be formed by utilizing shrinkage due to firing in the firing process of the element body 10B. The same configuration applies to the configuration of a second recess 60B.

Figure 7C:
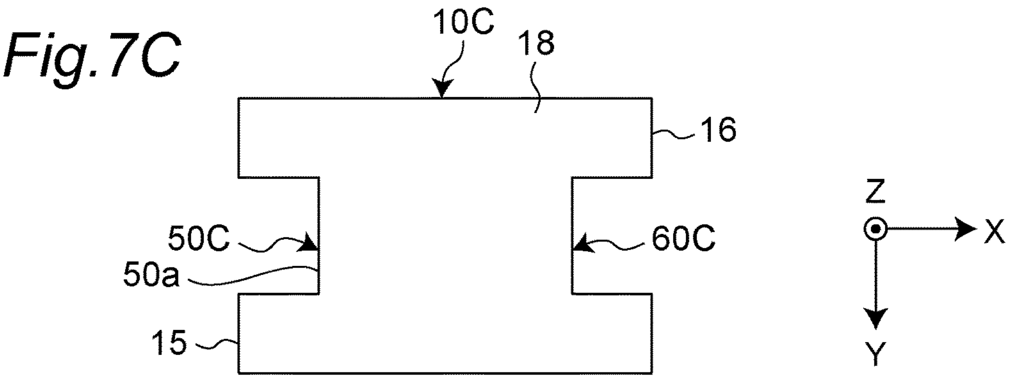
FIG. 7C is a plan view, seen from the top surface, showing another mode of the recess of the element body.

As shown in FIG. 7C, in a first recess 50C of an element body 10C, the depth of the first recess 50C along the X direction is constant in the Y direction. Specifically, the inner surface 50*a* of the first recess 50C is formed into a rectangular shape when viewed from the Z direction.

According to the above configuration, since the shape of the first recess 50C is a simple shape, the first recess 50C can easily be formed. The same configuration applies to the configuration of a second recess 60C.

Figure 7D:
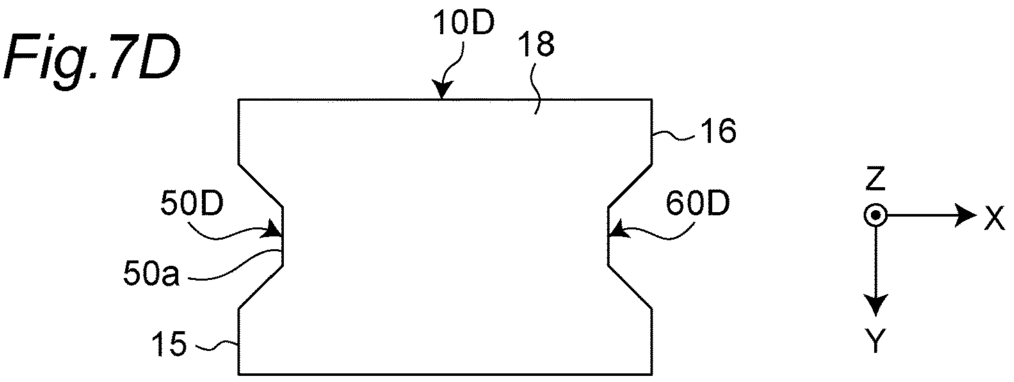
FIG. 7D is a plan view, seen from the top surface, showing another mode of the recess of the element body.

As shown in FIG. 7D, in a first recess 50D of an element body 10D, the depth of the first recess 50D along the X direction becomes greater continuously and then becomes constant toward the center of the first recess 50B in the Y direction. Specifically, the inner surface 50*a* of the first recess 50D is formed into a trapezoidal shape when viewed from the Z direction.

According to the above configuration, since the capacity of the first recess 50D can be reduced, the volume of the element body 10D can be increased so that lowering of the inductance can be suppressed. The same configuration applies to the configuration of the second recess 60D.

The present disclosure is not limited to the above embodiments and the design can variously be changed without departing from the gist of the present disclosure. For example, the respective features of the first and second embodiments may variously be combined. Specifically, the number of the coils and the number of the external electrodes may be increased and the number of coil wirings making up the coil may be increased or decreased. Although the shapes of the first and second recesses are the same, they may differ or they may be any shapes. Only one of the first and second recesses may be disposed or neither the first recess nor the second recess may be disposed.

Although in the embodiments the axis of the coil is orthogonal to the side surfaces of the element body, it may be orthogonal to the end surfaces of the element body or may be orthogonal to the bottom surface of the element body.

Although in the embodiments the external electrodes are disposed only in the recesses of the end surfaces, they may be disposed in the recesses of the end surfaces and on the bottom surface continuously or may be disposed in the recesses of the end surfaces and on the bottom surface and top surface continuously.

Example

An example of the method of manufacturing the inductor component 1 will be described below.

First, an insulating paste containing borosilicate glass as the main component is repeatedly applied on a base material such as a carrier film by screen printing, to form an insulating layer. This insulting layer acts as an insulating layer for the outer layer located outside the coil conductor layer. The base material is peeled off from the insulating layer at any process and does not remain in the state of the inductor component.

After that, a photosensitive conductive paste layer is applied and formed on the insulating layer, to form the coil conductor layer and an external electrode conductor layer by a photolithography process. Specifically, photosensitive conductive paste containing Ag as the metal main component is applied on the insulating layer by screen printing, to form the photosensitive conductive paste layer. Furthermore, the photosensitive conductive paste layer is irradiated with ultraviolet rays, etc. via a photomask and is developed with an alkaline solution or the like. As a result, the coil conductor layer and the external electrode conductor layer are formed on the insulating layer. At this time, the coil conductor layer and the external electrode conductor layer can be drawn in desired patterns by the photomask.

Then, a photosensitive insulating paste layer is applied and formed on the insulating layer, to form an insulating layer having an opening and a via hole by the photolithography process. Specifically, photosensitive insulating paste is applied on the insulating layer by screen printing, to form the photosensitive insulating paste layer. Furthermore, the photosensitive insulating paste layer is irradiated with ultraviolet rays, etc. via a photomask and is developed with an alkaline solution or the like. At this time, the photosensitive insulating paste layer is patterned by the photomask such that the opening is disposed above the external electrode conductor layer and the via hole is disposed on the end portions of the coil conductor layer.

After that, a photosensitive conductive paste layer is applied and formed on the insulating layer disposed with the opening and the via hole, to form the coil conductor layer and the external electrode conductor layer by the photolithography process. Specifically, photosensitive conductive paste containing Ag as the metal main component is applied on the insulating layer by the screen printing so as to fill the opening and the via hole, to form the photosensitive conductive paste layer. Furthermore, the photosensitive conductive paste layer is irradiated with ultraviolet rays, etc. via a photomask and is developed with an alkaline solution or the like. This allows the external electrode conductor layer connected to the lower external electrode conductor layer via the opening and the coil conductor layer connected to the lower coil conductor layer via the via hole to be formed on the insulating layer.

By repeating the above process of forming the insulating layer and the coil conductor layer and external electrode conductor layer, there are formed a coil composed of the coil conductor layers formed on a plurality of insulating layers and an external electrode composed of the external electrode conductor layers formed on a plurality of insulating layers. Furthermore, an insulating layer is formed by repeatedly applying insulating paste by screen printing onto the insulating layer formed with the coil and the external electrode. This insulating layer acts as an insulating layer for the outer layer located outside the coil conductor layer. By changing the width dimensions of the plurality of insulating layers to dispose steps on the plurality of insulating layers, a stepwise recess is formed on the end surfaces of the element body composed of the plurality of insulating layers. The external electrode is disposed in this recess. A mother laminate can be obtained by forming a set of the coil and the external electrode in a matrix on the insulating layers in the above process.

After that, the mother laminate is cut into a plurality of unfired laminates by dicing or the like. In the mother laminate cutting process, the external electrode is exposed from the mother laminate on a cut surface formed by cutting. At this time, when a certain amount of cut deviation occurs, the outer peripheral edge of the coil conductor layer formed in the above process appears on the end surfaces or on the bottom surface.

Then, the unfired laminate is fired under predetermined conditions to obtain an element body including the coil and the external electrodes. Barrel processing is applied to this element body to polish it into an appropriate outer size, while Ni plating having a thickness of 2 μm to 10 μm and Sn plating having a thickness of 2 μm to 10 μm are applied to portions where the external electrodes are exposed from the laminate. Through the above processes, an inductor component of 0.4 mm×0.2 mm×0.2 mm is completed.

The conductor pattern forming method is not limited to the above. For example, the method may be a conductor paste print lamination method using a screen plate that opens in the shape of a conductor pattern; a method of patterning, by etching, a conductor film formed by sputtering method, thin film deposition method, crimping of foil, etc.; or a method like the semi-additive method in which a negative pattern is formed so that a conductor pattern is formed by a plating film, after which unnecessary portions are removed. Furthermore, by achieving a high aspect ratio by shaping the conductor pattern into multiple steps, loss caused by resistance at high frequencies can be reduced. More specifically, it may be a process of repeating the formation of the conductor pattern; a process of repeatedly stacking the wiring formed by the semi-additive process; a process of forming part of the stack by the semi-additive process but forming the other by etching the film grown by plating; or a process combined with a process of further growing, by plating, the wiring formed by the semi-additive process, to increase the aspect ratio.

The conductor material is not limited to the Ag paste as described above and the conductor of any good conductor such as Ag, Cu, Au formed by sputtering method, thin film deposition method, crimping of foil, plating, etc. may be used. The method of forming the insulting layer and the opening and via hole is not limited to the above, and it may be a method of opening by laser or drilling after crimping, spin coating, or spraying the insulating material sheet.

The insulating material is not limited to glass and ceramic materials described above. It may be organic materials such as epoxy resin, fluororesin, and polymer resin or may be composite materials such as glass epoxy resin. It is desirable however that the dielectric constant and the dielectric loss be small.

The size of the inductor component is not limited to the above. The external electrode forming method is not limited to the method of applying plating to the external conductor exposed by cutting, and may be a method of applying plating the external electrodes further formed by conductor paste dipping, sputtering, etc. after cutting.

What is claimed is:

1. An inductor component comprising:

an element body having a length, a width, and a height, the length being greater than the width and height, and the element body comprising a first end surface and a second end surface that lie on both end sides in the length direction, a first side surface and a second side surface that lie on both end sides in the width direction, and a bottom surface and a top surface that lie on both end sides in the height direction;

a coil disposed within the element body and wound along an axial direction;

a first external electrode and a second external electrode that are disposed within the element body and electrically connected to the coil; and a first solder fillet that is on the first external electrode and does not extend beyond an outermost surface portion of the first end surface of the element body, and a second solder fillet that is on the second external electrode and does not extend beyond an outermost surface portion of the second end surface of the element body, in an inner diameter of the coil, the inner diameter of the coil at both end portions in the axial direction being greater than the inner diameter of the coil at a central portion in the axial direction.

2. The inductor component of claim 1, wherein the inner diameter of the coil becomes greater continuously from the central portion of the coil toward the both end portions of the coil.

3. The inductor component of claim 1, wherein the inner diameter of the coil becomes greater stepwise from the central portion of the coil toward the both end portions of the coil.

4. The inductor component of claim 1, wherein the element body is of a rectangular parallelepiped shape, and wherein the coil has an axis parallel to the width direction, and the first external electrode is disposed only on the first end surface, the second external electrode being disposed only on the second end surface.

5. The inductor component of claim 4, wherein the first end surface and the second end surface each have a recess, wherein the recess opens to the bottom surface, the first external electrode is disposed in the recess of the first end surface, and the second external electrode is disposed in the recess of the second end surface.

6. The inductor component of claim 5, wherein a depth of the recess along the length direction becomes greater toward a center of the recess in the width direction.

7. The inductor component of claim 6, wherein the depth of the recess along the length direction becomes greater stepwise toward the center of the recess in the width direction.

8. The inductor component of claim 5, wherein the coil includes:

a winding part helically wound overlapping when viewed from the axial direction;

a first drawing part that is out of the winding part and connected to the first external electrode; and a second drawing part that is out of the winding part and connected to the second external electrode, and the recess has an inner surface that is along a contour of the winding part when viewed from the height direction.

9. The inductor component of claim 5, wherein the recess has an inner surface that is symmetrical with respect to a center of the recess in the width direction when viewed from the height direction.

10. The inductor component of claim 5, wherein the coil includes:

a winding part helically wound overlapping when viewed from the axial direction;

a first drawing part that is out of the winding part and connected to the first external electrode; and a second drawing part that is out of the winding part and connected to the second external electrode, wherein the recess has an inner surface that is along a contour of the winding part when viewed from the height direction, a minimum distance between the first external electrode and the contour of the winding part is 10 μm or more, and a minimum distance between the second external electrode and the contour of the winding part is 10 μm or more.

11. An electronic component comprising:

an inductor component of claim 5; and a mounting board having a main surface on which a first land and a second land are arranged, the first external electrode of the inductor component being electrically connected to the first land via the first solder fillet, the second external electrode being electrically connected to the second land via the second solder fillet, in a direction perpendicular to the main surface of the mounting board, the first land, the second land, and the first and second solder fillets being absent between the coil and the main surface.

12. An electronic component comprising:

an inductor component of claim 5; and a mounting board having a main surface on which a first land and a second land are arranged, the first external electrode of the inductor component being electrically connected to the first land via the first solder fillet, the second external electrode being electrically connected to the second land via the second solder fillet, when viewed from the axial direction, the first land having a first outer end surface located opposite to the second land, the second land having a second outer end surface located opposite to the first land, the length of the element body being equal to or greater than a distance between the first outer end surface and the second outer end surface.

13. The inductor component of claim 2, wherein the element body is of a rectangular parallelepiped shape, and wherein the coil has an axis parallel to the width direction, and the first external electrode is disposed only on the first end surface, the second external electrode being disposed only on the second end surface.

14. The inductor component of claim 3, wherein the element body is of a rectangular parallelepiped shape, and wherein the coil has an axis parallel to the width direction, and the first external electrode is disposed only on the first end surface, the second external electrode being disposed only on the second end surface.

15. The inductor component of claim 6, wherein the coil includes:

a winding part helically wound overlapping when viewed from the axial direction;

a first drawing part that is out of the winding part and connected to the first external electrode; and a second drawing part that is out of the winding part and connected to the second external electrode, and the recess has an inner surface that is along a contour of the winding part when viewed from the height direction.

16. The inductor component of claim 7, wherein the coil includes:

a winding part helically wound overlapping when viewed from the axial direction;

a first drawing part that is out of the winding part and connected to the first external electrode; and a second drawing part that is out of the winding part and connected to the second external electrode, and the recess has an inner surface that is along a contour of the winding part when viewed from the height direction.

17. The inductor component of claim 6, wherein the recess has an inner surface that is symmetrical with respect to a center of the recess in the width direction when viewed from the height direction.

18. The inductor component of claim 6, wherein the coil includes:

a winding part helically wound overlapping when viewed from the axial direction;

a first drawing part that is out of the winding part and connected to the first external electrode; and a second drawing part that is out of the winding part and connected to the second external electrode, wherein the recess has an inner surface that is along a contour of the winding part when viewed from the height direction, a minimum distance between the first external electrode and the contour of the winding part is 10 μm or more, and a minimum distance between the second external electrode and the contour of the winding part is 10 μm or more.

19. An electronic component comprising:

an inductor component of claim 6; and a mounting board having a main surface on which a first land and a second land are arranged, the first external electrode of the inductor component being electrically connected to the first land via the first solder fillet, the second external electrode being electrically connected to the second land via the second solder fillet, in a direction perpendicular to the main surface of the mounting board, the first land, the second land, and the first and second solder fillets being absent between the coil and the main surface.

20. An electronic component comprising:

an inductor component of claim 6; and a mounting board having a main surface on which a first land and a second land are arranged, the first external electrode of the inductor component being electrically connected to the first land via the first solder fillet, the second external electrode being electrically connected to the second land via the second solder fillet, when viewed from the axial direction, the first land having a first outer end surface located opposite to the second land, the second land having a second outer end surface located opposite to the first land, the length of the element body being equal to or greater than a distance between the first outer end surface and the second outer end surface.

* * * * *